(12) United States Patent
Slack

(10) Patent No.: US 7,938,223 B2
(45) Date of Patent: May 10, 2011

(54) SINTERED ELEMENTS AND ASSOCIATED SYSTEMS

(75) Inventor: Mark Slack, Ilkeston (GB)

(73) Assignee: Cooper Technologies Company, Houston, TX (US)

( * ) Notice: Subject to any disclaimer, the term of this patent is extended or adjusted under 35 U.S.C. 154(b) by 13 days.

(21) Appl. No.: 12/124,903

(22) Filed: May 21, 2008

(65) Prior Publication Data

US 2009/0288909 A1 Nov. 26, 2009

(51) Int. Cl.
*G10K 13/00* (2006.01)
*H04R 1/22* (2006.01)
*H04R 1/20* (2006.01)

(52) U.S. Cl. ......... 181/152; 181/159; 381/189; 381/343

(58) Field of Classification Search .................. 181/152, 181/159, 194; 381/340, 343, 341, 189, 354
See application file for complete search history.

(56) References Cited

U.S. PATENT DOCUMENTS

| | | | | |
|---|---|---|---|---|
| 1,114,496 A | * | 10/1914 | Lyon | 381/344 |
| 2,801,768 A | * | 8/1957 | Immel | 220/88.2 |
| 3,170,504 A | * | 2/1965 | Lanning | 431/328 |
| 3,324,924 A | * | 6/1967 | Hailstone et al. | 431/328 |
| 3,375,093 A | * | 3/1968 | Reising | 65/25.4 |
| 3,536,158 A | * | 10/1970 | Blair | 181/159 |
| 3,635,599 A | * | 1/1972 | Bryant et al. | 417/53 |
| 3,652,810 A | * | 3/1972 | Weingartner | 381/177 |
| 3,748,111 A | * | 7/1973 | Klose | 48/192 |
| 3,810,732 A | * | 5/1974 | Koch | 431/7 |
| 3,841,520 A | * | 10/1974 | Bryant et al. | 220/88.2 |
| 3,867,586 A | * | 2/1975 | Maekawa et al. | 381/340 |
| 4,157,741 A | * | 6/1979 | Goldwater | 381/342 |
| 4,504,218 A | * | 3/1985 | Mihara et al. | 431/326 |
| 4,510,874 A | * | 4/1985 | Hasenack | 110/347 |
| 4,878,835 A | * | 11/1989 | Martens | 431/187 |
| 4,965,839 A | * | 10/1990 | Elieli | 381/339 |
| 4,975,965 A | * | 12/1990 | Adamson | 381/343 |
| 4,995,113 A | * | 2/1991 | Robineau et al. | 381/117 |
| 5,057,006 A | * | 10/1991 | Follert et al. | 431/328 |
| 5,117,462 A | * | 5/1992 | Bie | 381/343 |
| 5,117,463 A | * | 5/1992 | Oyaba et al. | 381/347 |
| 5,953,436 A | * | 9/1999 | Zimmermann | 381/396 |
| 5,987,148 A | * | 11/1999 | Hsieh | 381/397 |
| 6,036,478 A | * | 3/2000 | Inada | 431/344 |
| 6,127,918 A | * | 10/2000 | Lin | 340/388.1 |
| 6,144,309 A | * | 11/2000 | Fagence | 340/691.1 |
| 7,095,868 B2 | | 8/2006 | Geddes | 381/343 |
| 2008/0124566 A1 | * | 5/2008 | Smallman et al. | 428/606 |
| 2009/0060246 A1 | * | 3/2009 | Baliga et al. | 381/354 |

FOREIGN PATENT DOCUMENTS

| | | | |
|---|---|---|---|
| EP | 0555951 A1 | * | 8/1993 |
| EP | 0 822 732 B1 | | 2/2004 |
| JP | 63105306 A | * | 5/1988 |
| JP | 02233908 A | * | 9/1990 |
| JP | 11297334 A | * | 10/1999 |
| WO | WO 00/27479 | | 5/2000 |

* cited by examiner

*Primary Examiner* — Edgardo San Martin
(74) *Attorney, Agent, or Firm* — King & Spalding LLP

(57) ABSTRACT

Sintered elements for use in hazardous areas comprise a first flame path having a first length and a first pore size, and a second flame path having a second length and a second pore size. The second length is greater than the first length and the second pore size is greater than the first pore size. Sounders and loud speakers for use in hazardous areas comprise a housing having a horn and a rear enclosure, a driver assembly, and a sintered element.

19 Claims, 5 Drawing Sheets

SINTERED ELEMENTS AND ASSOCIATED SYSTEMS

TECHNICAL FIELD

The invention relates generally to sintered elements, as well as sounders and loud speakers including sintered elements.

BACKGROUND OF THE INVENTION

Sounders and loud speakers may be used to alert persons that a hazardous situation exists in an area, such as in harsh environmental conditions found offshore and onshore in the oil, gas, and petrochemical industries. Sounders are usually used for reproduction of sound tones, such as fire alarms. Loud speakers are usually used for live speech production via an amplifier and a microphone. As used herein, the term "speakers" collectively refers to sounders and loud speakers. The design dilemma faced when designing a speaker for use in such hazardous areas is that speakers are fundamentally reliant on the unimpeded movement of air in and out of the speaker housing. However, hazardous area requirements dictate that the speaker housing must be sealed from the surrounding atmosphere to fully contain any possible sources of ignition within the housing, thus preventing propagation of an explosion. Therefore, speakers for use in hazardous areas must be designed to contain an internal explosion, while emitting sound (compressions in air), without compromising the strength and integrity of the speaker.

Currently, hazardous area speakers are based around a compression driver unit used to produce sound and disposed in an enclosure and a re-entrant horn used to provide impedance matching between air and a driver diaphragm, such as in a megaphone. The arrangement of the compression driver and the re-entrant horn is favored in the industry, as it allows the use of a sinter positioned in the throat of the re-entrant horn. As used herein, the term "sinter" refers to any sintered element that allows compressions of air (sound) to at least partially pass through, but also has the ability to remove some heat energy from a flame passing therethrough. The sinter should allow sound created by the driver to pass out of the enclosure and into the re-entrant horn to be amplified but also should "arrest" a flame. In other words, the sinter should have the ability to prevent flame transmission by removing one element (heat) of the combustion triangle (oxygen, fuel, and heat).

Conventional sinters are produced by pressing together sinter material, such as small bronze balls about 200 microns in diameter or stainless steel flakes, in a die to form a substantially circular, square, or rectangular component. The component is then heated to a temperature below the actual melting point of the material but at a high enough temperature to allow the sinter particles to fuse together. The sinter particles fuse together in the areas where they are in contact with each other. Ultimately, the fused sinter particles form a matrix of channels within the component, thus forming a sintered element. The sinter's ability to extinguish combustion results from the transfer of heat energy, or enthalpy, from the flame to the solid matrix of channels within the sinter. The rate of heat transfer depends on the temperature gradient between the flame and the sinter, the channel hydraulic diameter, and the thermal conduction (diffusivity) properties of the gas.

Several disadvantages to conventional sinters exist however. Since the sinter effectively acts as a heat sink, its own temperature increases as it conducts heat energy away from the flame. Eventually the temperature rise reaches a point where the sinter itself becomes an ignition source. This rise limits the ambient temperature range in which the product can be operated. Since the ability of a sinter to arrest a flame, and at the same time to allow sound to pass through, essentially depends on the relationship between pore size and flame path length, an increase in flame path length results in a corresponding nonlinear increase in pore size for a given degree of flame transmission protection under constant explosive atmospheric conditions. In other words, an increase in pore size compromises the sinter's ability to arrest a flame, while a decrease in pore size compromises sound emission or sound pressure level.

Additionally, when a conventional sinter is used in a hazardous area product, the maximum possible pore size must be specified and cannot be exceeded in production, since the largest pore is where a flame will pass through the sinter first. To achieve the requirement of not exceeding the maximum pore size during production of a sinter, a nominal pore size is specified where the manufacturing tolerance is such that the maximum pore size is not exceeded. The net result is that for a sinter with a certified maximum pore size of, for example, 250 microns, the nominal pore size may be around 200 microns and could be as low as 150 microns, resulting in lower sound pressure level through the sinter. The smaller the mean pore size, the lower the sound pressure level. Currently, the detrimental effect that the resultant mean pore size has on the sound output is simply accepted in the industry. Furthermore, the current process of manufacturing sinters results in a low yield of sinters (approximately less than 50% from a batch produced) that may be used in a hazardous area. Thus, the cost of manufacturing and testing usable sinters is high.

Therefore, a need exists in the art for a sintered element that can be economically produced while effectively arresting a flame without compromising sound pressure level.

SUMMARY OF THE INVENTION

The present invention can satisfy the above-described need by providing sintered elements and speaker systems for use in hazardous areas.

The sinters of the present invention include at least two flame paths. The two flame paths have different lengths and pore size. The longer flame path may have a greater pore size while the shorter flame path may have a smaller pore size. The cross-section of the flame paths may be any shape, including a square, circle, rectangle, ellipse, triangle, and other suitable shapes. The flame paths may transverse the sinter by a straight, curved, random, parabolic, helical, or other suitable path.

The sinters of the present invention may be fabricated from any thermally conductive material. In some aspects, the sinter is shaped substantially similar to an elliptic paraboloid. The sinter may have a solid edge and a thicker central portion. In some aspects, the longer flame path is positioned in the central portion while the shorter flame path is positioned away from the central portion.

The speaker systems of the present invention include a sinter of the present invention. The speaker includes a horn coupled to an enclosure, a driver assembly positioned within the speaker, and the sinter positioned between the driver assembly and a path to an exterior of the speaker. The horn may include an inner horn positioned within an outer horn. In some aspects, the driver assembly includes a diaphragm.

These and other aspects, objects, and features of the invention will become apparent to those having ordinary skill in the art upon consideration of the following detailed description of exemplary embodiments exemplifying the best mode for carrying out the invention as presently perceived.

BRIEF DESCRIPTION OF THE DRAWINGS

The present invention may be better understood by reading the following description of non-limiting embodiments with reference to the attached drawings wherein like parts of each of the figures are identified by the same reference characters, and which are briefly described as follows.

DETAILED DESCRIPTION OF THE INVENTION

The invention provides sintered elements having a pore size related to a flame path length across a section of the sintered element, and to speakers including such sinters. The following description of exemplary embodiments of the invention will refer to the attached drawings.

Figure 1A:
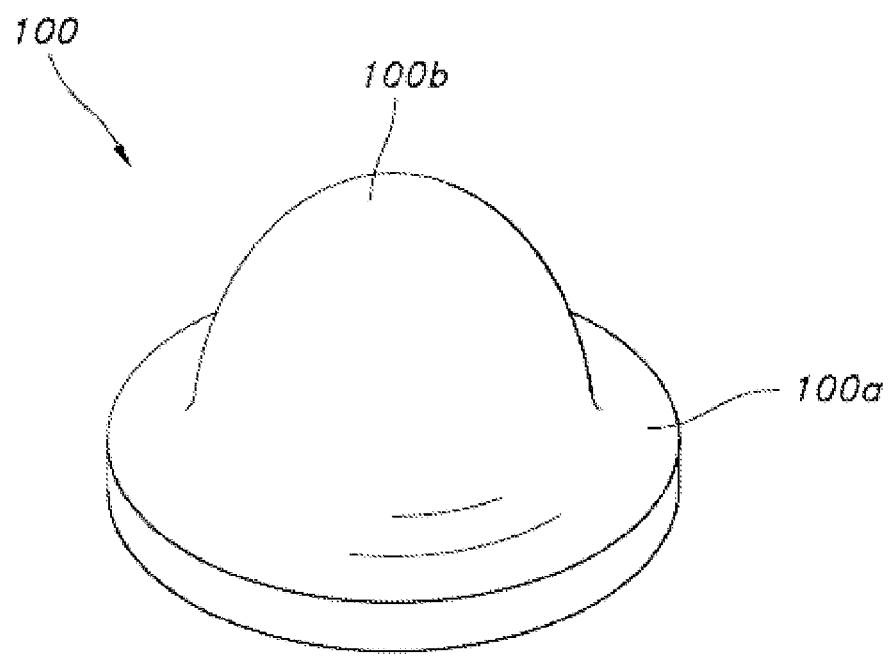
FIG. 1A is a perspective view of a sintered element according to an exemplary embodiment.

Referring to FIG. 1A, an exemplary embodiment of a sinter 100 is illustrated. The sinter 100 is shaped substantially similar to an elliptic paraboloid. The sinter 100 comprises an outer area 100a having a solid circular thickness. The thickness of the sinter 100 increases towards a center area 100b. A person having ordinary skill in the art and the benefit of this disclosure will recognize that the invention may include sinter configurations other than the ones shown in the Figures.

Figure 1B:
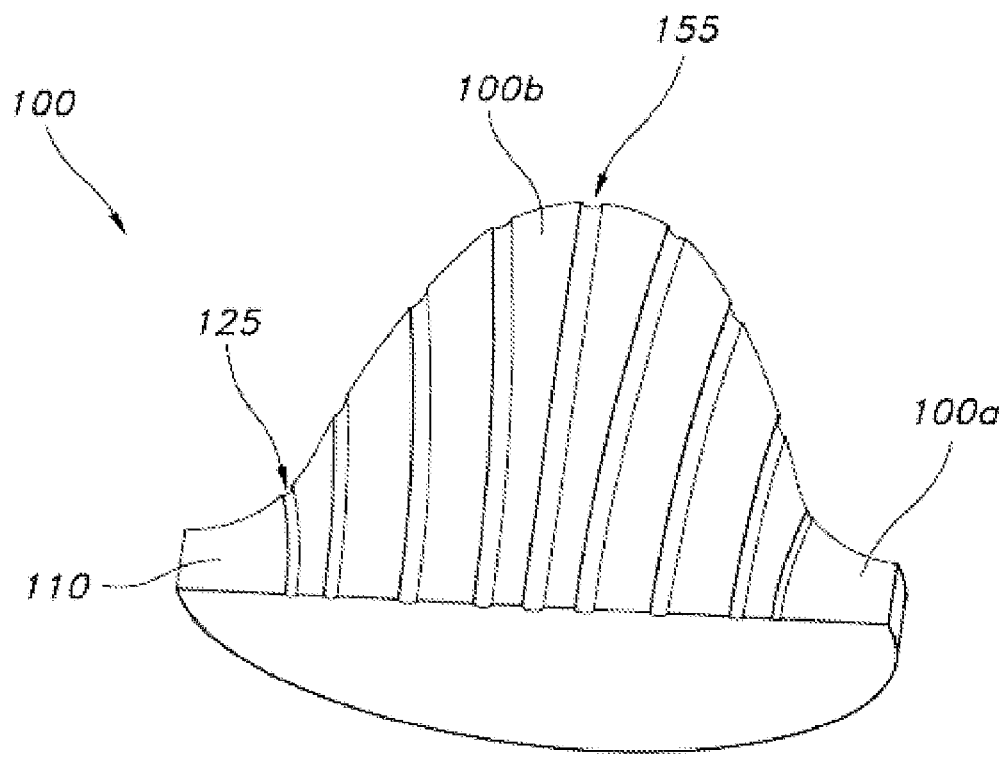
FIG. 1B is a diagrammatic representation of a sectional view of the sintered element illustrated in FIG. 1A, depicting the relationship between the length of the flame path and pore diameter, according to an exemplary embodiment.
Figure 1C:
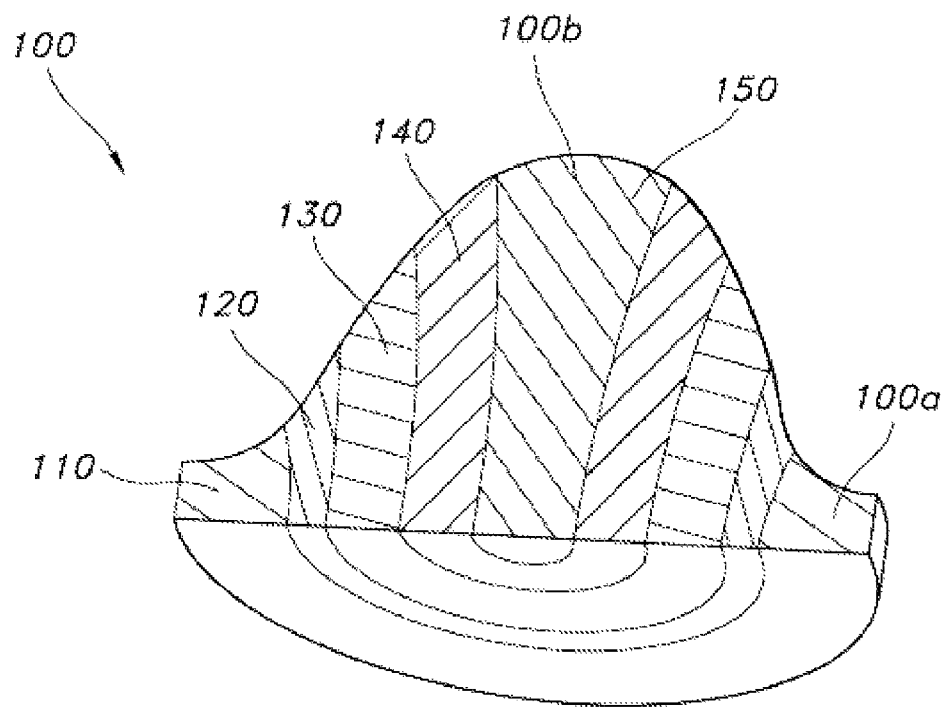
FIG. 1C is a diagrammatic representation of a sectional view of the sintered element illustrated in FIG. 1A, depicting the relationship between the length of the flame path and the pore diameter by section, according to an exemplary embodiment.

Referring to FIGS. 1B-1C, the sinter 100 includes sections of varying thickness across any given cross-section of the sinter 100. For example, the sinter 100 may include solid sections 110 disposed in the outer area 100a of the sinter 100, areas 120 with flame paths 125 having a shortest length and smallest diameter (or pore size), areas 130 with flame paths having a length and diameter greater than the flame paths 125, areas 140 with flame paths having a length and diameter greater than the flame paths in the areas 130, and an area 150 proximate the center area 100b with a flame path 155 having a length and diameter greater than the flame paths in the areas 140. Generally, an increase in the thickness of the sinter 100 across its section may result in an increase in flame path length. A person having ordinary skill in the art and the benefit of this disclosure will recognize that any number of areas having flame paths of differing lengths and pore size may be defined for a given cross-section. Furthermore, the cross-section of each of the flame paths may be substantially similar to any shape, including, but not limited to, square, rectangular, circular, elliptical, triangular, and other suitable shapes.

While FIG. 1B illustrates a sinter having substantially linear channels traversing its cross-section, the flame paths may be configured to follow a randomized path. In alternative embodiments, the channels may follow a curved, parabolic, helical, or other suitable path. Generally, the sinter 100 is designed based on controlling size and geometry of free volumes within the sinter 100, in other words, controlling pore size, and relating this pore size to the flame path length.

Figure 2:
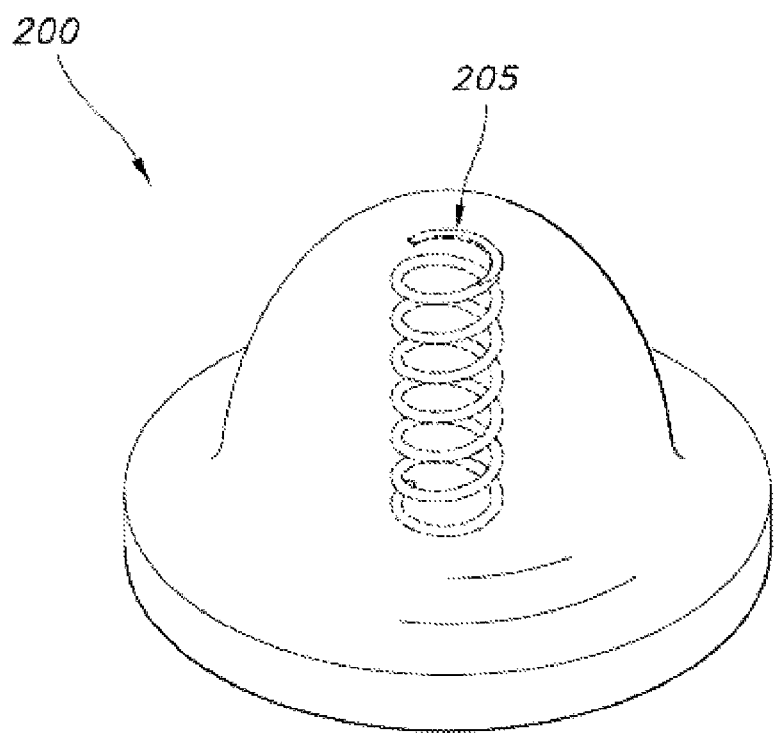
FIG. 2 is a perspective view of a sintered element according to an alternative exemplary embodiment.

Referring to FIG. 2, a sinter 200 according to an alternative exemplary embodiment is illustrated. The sinter 200 is similar to the sinter 100, with the difference being the flame path configuration. The sinter 200 includes a helical flame path 205. However, a person having ordinary skill in the art and the benefit of this disclosure will recognize that the sinter 200 may include a number of flame paths having varying configurations.

Sinters 100, 200 of the present invention may be fabricated from any thermally conductive material. Suitable examples of sinter materials include, but are not limited to, copper, aluminum, stainless steel, other metal alloys such as austenitic nickel-based superalloys, reactive materials such as titanium, and thermally conductive polymers. Sinters 100, 200 can withstand the dynamic effects of explosions without permanent distortion or damage which would impair their flame-arresting properties.

Sinters 100, 200 may be formed using rapid prototyping, and more particularly rapid manufacturing. As used herein, the terms "rapid prototyping" and "rapid manufacturing" refer to any technique related to the automated construction of physical objects using solid freeform fabrication. A particular time frame for fabrication is not implied by the terms. Suitable methods of manufacturing the exemplary sinters 100, 200 include, but are not limited to, Laser Engineered Net Shaping™ (LENS), or laser fusing, developed by Sandia National Laboratories, and Selective Laser Sintering ™ (SLS) developed by 3D Systems, Inc. Fuse deposition techniques, combined with computational fluid dynamics, can allow accurate depositing of materials to create a sinter such that the creation of voids within the sinter can be controlled. The size and shape of these voids can be controlled as desired to produce a desired length and pore size for each void to adequately suppress a flame while allowing an increased amount of acoustical sound waves to pass.

Using rapid prototyping to manufacture the sinters 100, 200 may result in an increased yield of usable sinters (for example, approximately 90-95% of batch produced) compared to conventional sinter production methods since the maximum pore size, minimum pore size, and mean pore size may be specified prior to manufacturing the sinters 100, 200. Thus, a cost benefit may be realized as a greater yield of sinters produced in a single batch via rapid prototyping are usable.

The sinters 100, 200 may be used in combination, for example, with a speaker.

Figure 3A:
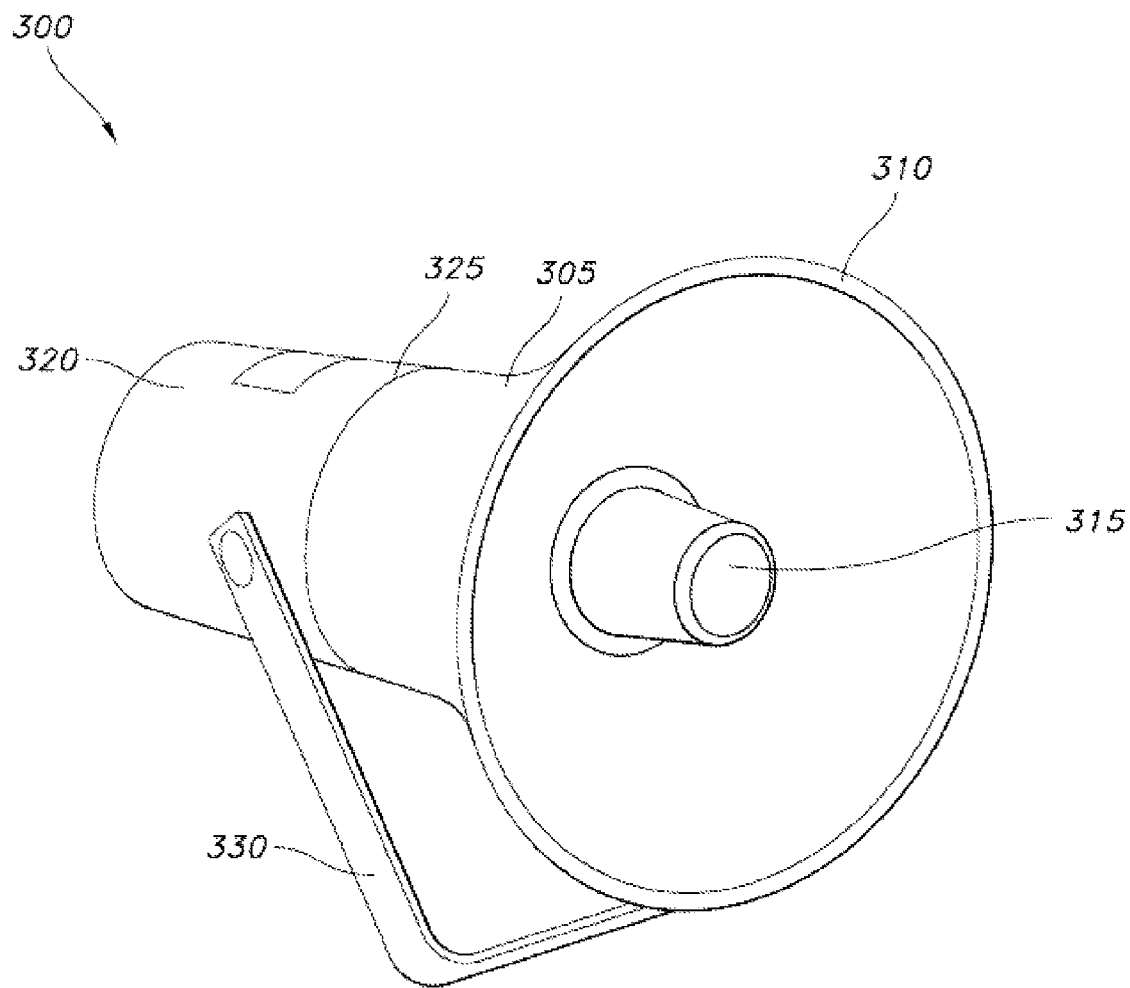
FIG. 3A is a perspective view of a speaker according to an exemplary embodiment.

Referring to FIG. 3A, an exemplary speaker 300 for use in hazardous areas is illustrated. The speaker 300 comprises a housing 305. The housing 305 comprises an outer horn 310 that tapers outwardly and aids in sound dispersion. The speaker 300 also comprises an inner horn 315 positioned within the outer horn 310. The inner horn 315 defines a sound re-entrant pathway. In certain exemplary embodiments, the outer horn 310 and inner horn 315 may be formed from a glass reinforced polyester material, as glass reinforced polyester materials are corrosion-resistant and may be used in areas where corrosive chemicals are present.

The housing 305 also comprises an enclosure 320 extending rearwardly from and coupled to the outer horn 310. In certain exemplary embodiments, a fastener (not shown) may be used to secure the outer horn 310 to the enclosure 320 at a joint 325. In certain alternative exemplary embodiments, the outer horn 310 may be secured to the enclosure 320 by threadably mating the two sections. The joint 325 also may function as a flame path in the event of an explosion. In certain exemplary embodiments, the enclosure 320 also may be fabricated from a glass reinforced polyester material. The enclosure 320 houses the electrical components of the speaker 300 as described below with respect to FIGS. 3B, 3C.

The speaker 300 also comprises a mounting bracket 330. In certain exemplary embodiments, the mounting bracket 330 may be mounted directly to enclosure 320. The mounting bracket 330 may be pivotally mounted to allow adjustment of the orientation of the speaker 300. However, alternate methods of securing the mounting bracket 330 to the speaker 300 are suitable. In certain embodiments, the mounting bracket 330 may be formed of a glass reinforced polyester material.

Figure 3B:
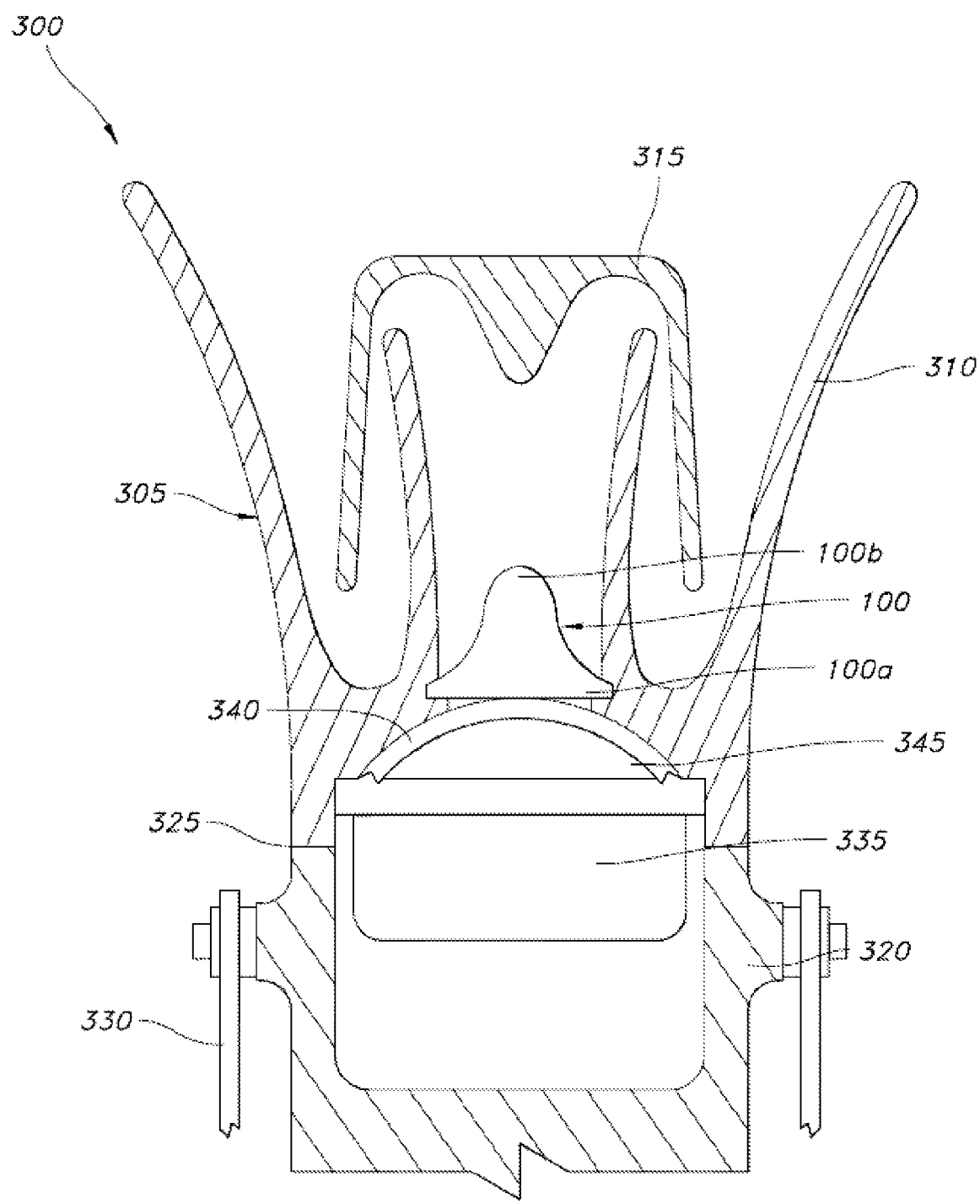
FIG. 3B is a sectional view of the speaker shown in FIG. 3A according to an exemplary embodiment.
Figure 3C:
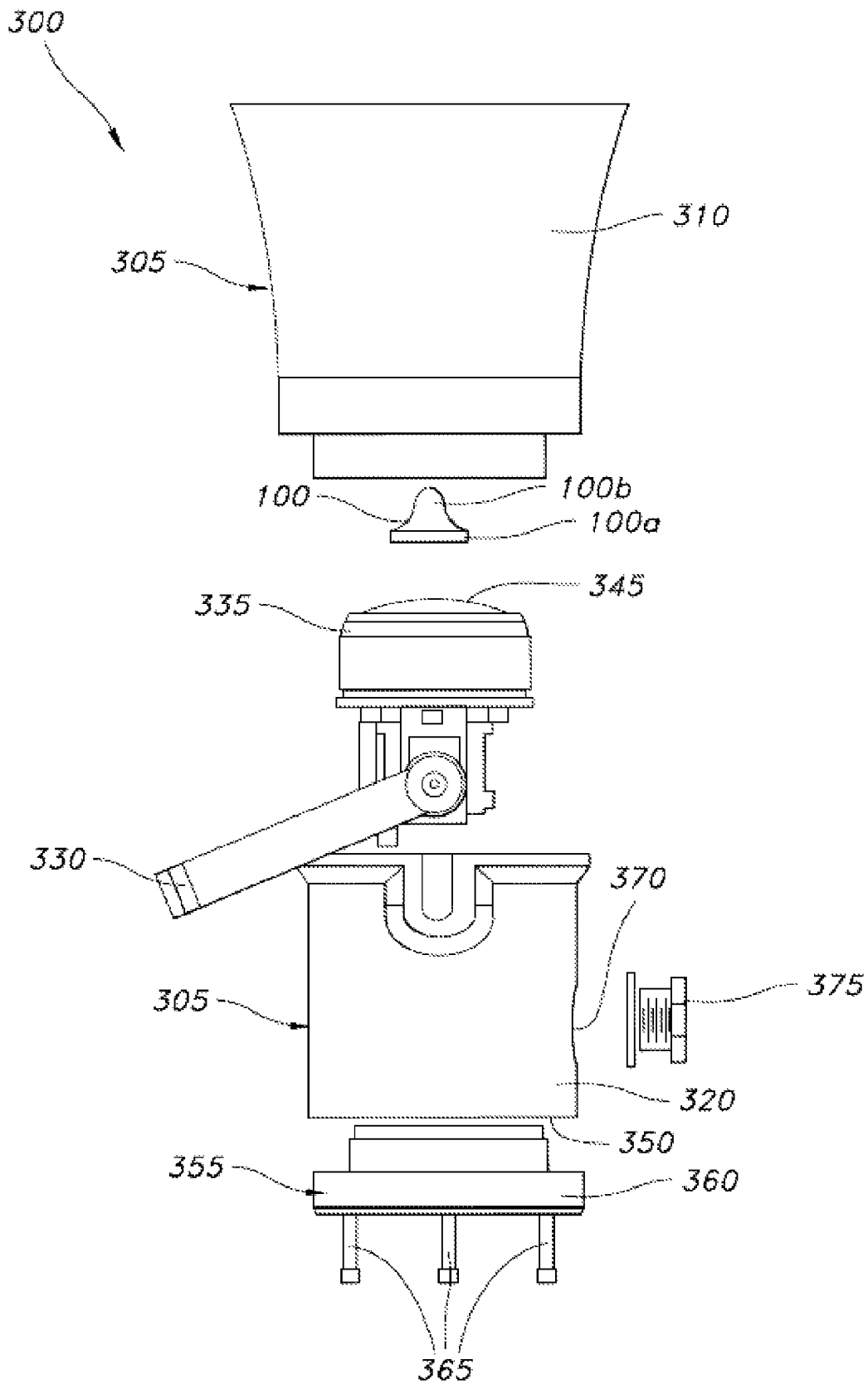
FIG. 3C is an exploded view of the speaker shown in FIG. 3A, illustrating the components and construction thereof according to an exemplary embodiment.

FIGS. 3B, 3C illustrate internal and external components of the speaker 300. The speaker 300 comprises the sinter 100 positioned within the inner horn 315. The sinter 100 may act as a flame-proof barrier between the outside atmosphere and the interior of the speaker 300. Additionally, more acoustical sound waves are able to pass through the center 100b of sinter 100 due to the design of the outer and inner horns 310, 315 (collectively referred to as the speaker horn). Accordingly, the tapered thickness design can allow for larger pores (and corresponding longer flame paths) towards the center 100b of the sinter 100. The larger pores can allow more acoustical sound waves to pass through the sinter 100, thereby increasing the output of the speaker 300. Shorter flame paths with smaller pores can be provided toward the edge 100a of the sinter 100 because less acoustical sound waves pass through the outside of the sinter 100 due to the horn design. Acoustical sound waves are highest in the center of the speaker horn and progressively decrease as a function of the distance from the center of the speaker horn. Accordingly, corresponding decreases in flame path length and pore size can be provided progressively away from the center 100b of the sinter 100. This design allows balancing flame suppression requirements with acoustical sound to increase the sound output and to produce a more acoustically efficient device.

The speaker 300 also comprises a driver assembly 335 positioned within the housing 305. The driver assembly 335 is used to produce sound that travels through the sinter 100. In the instance that speaker 300 is a sounder, the driver assembly 335 produces sound by receiving an electrical signal from an electronic printed circuit board assembly (not shown) housed inside the enclosure 320. In the instance that speaker 300 is a loud speaker, the driver assembly 335 produces sound by receiving an electrical signal from a transformer (not shown) housed inside the enclosure 320. The driver assembly 335 is positioned proximate the sinter 100 and separated from the sinter 100 by a gap 340. The driver assembly 335 comprises a diaphragm 345 adjacent the gap 340, wherein impedance matching between the driver diaphragm 345 and the outer air is provided by the inner horn 315.

The configuration of the driver assembly 335, sinter 100, and inner horn 315 within the speaker 300 allows sound created by the driver assembly 335 to pass out of the enclosure 320 and into the inner horn 315 to be amplified. The configuration also has the ability to arrest a flame since the sinter 100 creates a barrier between the driver 335 and an exterior of the speaker 300.

A rear end 350 of the enclosure 320 is covered by a cover member 355. The cover member 355 is disposed at least partially in the rear end 350 of the enclosure 320. The cover member 355 may be formed of a glass reinforced polyester material. The cover member 355 comprises a flange 360. A plurality of securing means, or screws 365, are used to fasten the flange 360 to the enclosure 320.

The enclosure 320 further comprises an aperture 370 to receive a cable (not shown) for supplying power to the speaker 300. A plug 375 is configured to mate with the aperture 370 to hold the cable in position, the cable being able to pass through plug 375.

Therefore, the present invention is well adapted to attain the ends and advantages mentioned as well as those that are inherent therein. The particular embodiments disclosed above are illustrative only, as the present invention may be modified and practiced in different but equivalent manners apparent to a person having ordinary skill in the art and the benefit of the teachings herein. Having described some exemplary embodiments of the present invention, the use of alternate sinter configurations having flame paths related to length and pore size is within the purview of those in the art. Additionally, while the present application discusses elliptic paraboloid sinters, it is understood that a number of other geometric configurations may be used based on the flame arrest and sound emission properties desired and using the teachings described herein. While numerous changes may be made by one having ordinary skill in the art, such changes are encompassed within the spirit of this invention as defined by the appended claims. Furthermore, the details of construction or design herein shown do not limit the invention, other than as described in the claims below. It is therefore evident that the particular illustrative embodiments disclosed above may be altered or modified and all such variations are considered within the scope and spirit of the present invention. The terms in the claims have their plain, ordinary meaning unless otherwise explicitly and clearly defined by the patentee.

What is claimed is:

1. A speaker, comprising:
    a housing comprising a horn coupled to an enclosure;
    a driver assembly positioned within the housing; and
    a sinter positioned between the driver assembly and a path to an exterior of the loudspeaker, the sinter comprising a first flame path having a first length and a first pore size and a second flame path having a second length and a second pore size, wherein the second length is greater than the first length, and wherein the second pore size is greater than the first pore size.

2. The speaker of claim 1, wherein the horn comprises an inner horn positioned within an outer horn.

3. The speaker of claim 1, where the sinter further comprises a first portion and a second portion, the second portion having a greater thickness than the first portion,
    wherein the first flame path is disposed in the first portion of the sinter, and
    wherein the second flame path is disposed in the second portion of the sinter.

4. The speaker of claim 3, wherein the first portion is disposed toward an edge of the sinter, and
    wherein the second portion is disposed near a center of the sinter.

5. The speaker of claim 1, wherein a cross-sectional area of the sinter along a direction of the first and second flame paths comprises a thickest portion near a center of the sinter,
    wherein the cross-sectional area decreases progressively in a direction outward from the center of the sinter,
    wherein the first flame path is disposed near the center of the sinter, and
    wherein the second flame path is disposed away from the center of the sinter.

6. The speaker of claim 1, wherein the sinter is formed with a thermally conductive material.

7. A sinter, comprising:
- a first flame path having a first length and a first pore size; and
- a second flame path having a second length and a second pore size;
- wherein the second length is greater than the first length, and
- wherein the second pore size is greater than the first pore size.

8. The sinter of claim 7, further comprising a first portion and a second portion, the second portion having a greater thickness than the first portion,
- wherein the first flame path is disposed in the first portion of the sinter, and
- wherein the second flame path is disposed in the second portion of the sinter.

9. The sinter of claim 8, wherein the first portion is disposed toward an edge of the sinter, and
- wherein the second portion is disposed near a center of the sinter.

10. The sinter of claim 7, wherein a cross-sectional area of the sinter along a direction of the first and second flame paths comprises a thickest portion near a center of the sinter, and
- wherein the cross-sectional area decreases progressively in a direction outward from the center of the sinter.

11. The sinter of claim 7, wherein the sinter comprises an elliptic paraboloid shape.

12. The sinter of claim 7, wherein at least one of the first flame path and the second flame path comprises a helical shape.

13. The sinter of claim 7, wherein a cross-section of the first flame path comprises a square, circular, rectangular, elliptical, or triangular shape.

14. The sinter of claim 7, wherein a cross-section of the second flame path comprises a square, circular, rectangular, elliptical, or triangular shape.

15. The sinter of claim 7, wherein the sinter is formed with a thermally conductive material.

16. The sinter of claim 7, wherein the sinter comprises a substantially solid object with the first and second flame paths disposed therein.

17. A sinter, comprising:
- a substantially solid shape comprising a plurality of tunnel-shaped paths disposed therein, the substantially solid shape comprising a thickness that progressively decreases as a function of a distance from a center of the sinter,
- wherein the tunnel-shaped paths progressively decrease in length as a function of a distance from the center of the sinter, and
- wherein longer ones of the tunnel-shaped paths have a larger cross-sectional area than shorter ones of the tunnel-shaped paths.

18. The sinter of claim 17, wherein the sinter comprises an elliptic paraboloid shape.

19. The sinter of claim 17, wherein at least one of the tunnel-shaped paths comprises a helical shape.

* * * * *